Jan. 16, 1968   H. SCHMITT   3,363,967
AUTOMATICALLY CONTROLLED SHUTTER FOR MOVIE CAMERAS
Filed July 26, 1965

Inventor
Helmut SCHMITT
By: Nolte & Nolte
ATTORNEYS

United States Patent Office 3,363,967
Patented Jan. 16, 1968

3,363,967
AUTOMATICALLY CONTROLLED SHUTTER
FOR MOVIE CAMERAS
Helmut Schmitt, Hausen, Bavaria, Germany, assignor to
P. Gossen G.m.b.H., Erlangen/Bavaria, Germany, a
firm of Germany
Filed July 26, 1965, Ser. No. 474,697
Claims priority, application Germany, Oct. 9, 1964,
G 41,747
2 Claims. (Cl. 352—204)

ABSTRACT OF THE DISCLOSURE

Shutter control means having: a rotatable shaft which is connected to the camera drive; said shaft is provided with a fixedly mounted shutter opening sector and cam means; a shutter closing sector is loosely mounted on the shaft and supports, on the one hand, a switch which is actuated by said cam to open a light-responsive control circuit and, on the other hand, an anchor of an electromagnet which is retained when said electromagnet is energized by the output of said control circuit.

---

The following invention relates to a simple and sturdy shutter for motion picture cameras.

The time of exposure for each frame is automatically adjustable according to the prevailing light conditions, regardless of the number of frames per second exposed. The measurement of the prevailing illumination of the subject being photographed may be accomplished by the use of a semi-transparent mirror deflecting part of the light incident on the camera objective to a photo-responsive device. The photo-responsive device may also have its own light-gathering optical system directed at the scene being photographed.

In motion picture cameras, in general, especially in general purpose and amateur cameras, the exposure is controlled by opening and closing an iris diaphragm in the lens as the available light varies. Even the best mechanisms now available for such iris control require the time of exposure of several frames for actuation, producing an annoying series of over-exposed or under-exposed frames as the available light changes. In addition to this, the control of exposure by a diaphragm limits certain artistic or scientific capabilities of the camera, which depend on the depth of focus, which in turn is directly dependent on the lens opening. In effect, the cinematographer should be able to utilize the lens opening in a manner dictated by the purpose he has in mind, and to alter the exposure as required by changing the shutter speed. Of course, this does not intend to imply that for a given film the available light might not require modification of the diaphragm opening to produce a correct exposure with the equipment available.

In view of the above considerations, it is a primary object of the present invention to provide a motion picture shutter mechanism which automatically adjusts itself to correctly expose each frame as determined by the available light.

It is a further object of the present invention to provide a motion picture camera which correctly exposes the film being un through it without altering the lens diaphragm.

The various features of novelty of the invention are best pointed out with particularity in the claims annexed to and forming a part of this specification. For a better understanding of the invention, its operating advantages and the specific objects attained by its use, reference should be had to the accompanying drawings and descriptive matter in which:

The shaft 1 is connected to the camera drive to make one turn per frame as the camera operates. A sector 2 is secured to the shaft 1 to rotate therewith, and is so proportioned as to cut off light travelling from the objective to the aperture 14 in the film gate when the film is in motion from one frame to the next. This sector, therefore, taken above, will produce an exposure for each frame as the camera operates, and, if the light striking the objective is correct for the lens opening, it will produce a correct exposure. Previous cameras require that the lens opening be adjusted to achieve that result, either manually, or automatically.

As has been said before, the present invention contemplates a mechanism which adjusts the exposure (shutter open time per frame) in accordance with the available effective light. For this purpose a second sector 4 is provided, and a means is utilized to cause said sector to cut off light from the objective upon completion of a proper exposure. For this purpose, the sector 4 is held in the position shown in FIG. 1 until the exposure (as measured by the light passing through the objective multiplied by the time required for the film being utilized) is complete.

Figure 1:
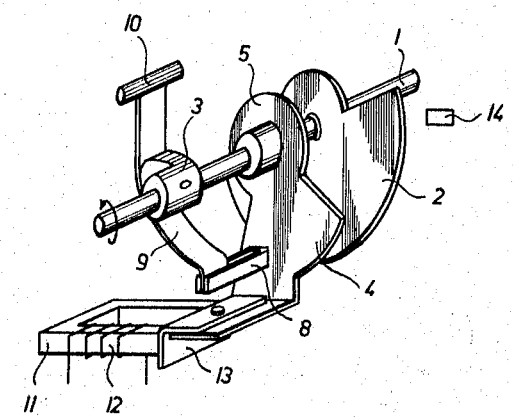
FIG. 1 is a perspective view, largely diagrammatic, of a preferred form of mechanism in accordance with the present invention.
Figure 2:
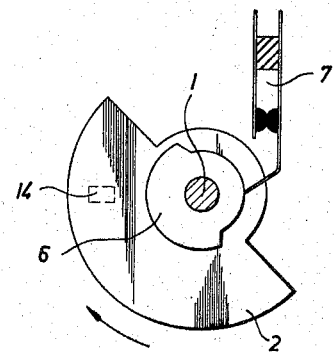
FIG. 2 is a view from the opposite end of the shaft shown in FIG. 1, showing part of the mechanism of FIG. 1.

According to FIG. 1, a shutter opening sector 2 and a cam 3 are fixedly mounted on an axis 1 driven in the direction of the arrow, while a shutter closing sector 4 with its bushing 5 is loosely attached to the axis 1. Behind the shutter opening sector 2 (as shown in FIG. 2) is a cam disc 6 fixedly mounted on the axis 1. The extending edge of cam 6 is adapted to strike against resilient contact 21 of switch 7 to break the electrical connection. During the alternate part of the camming cycle, contact 21 returns to its original position (as shown in FIG. 2) once again closing the connection. Mounted to the shutter closing sector 4 is a bifurcated projection 8 which is loosely engaged by one end of a spring leaf 9. This spring leaf is mounted at the other end thereof to a stationary clamping holder 10. An electromagnet 11 having a winding 12 is arranged beneath the axis 1. Within the effective range of the magnet poles, an anchor 13 is mounted on a deflected flap of the shutter closing sector 4. An opening 14 is arranged behind the shutter opening sector 2.

Figure 3:
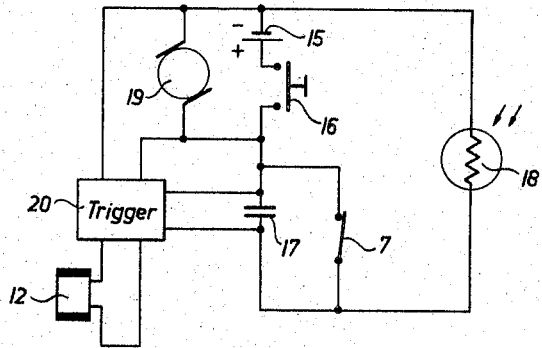
FIG. 3 is an electrical schematic diagram showing the relationship of the various components of the shutter and control mechanism.

In FIG. 3 the electric circuit is shown comprising a switch 16, a capacitor 17 which is bridged by the switch 7, a battery 15 in series with switch 16, a photo-resistor 18, a driving motor 19 and a trigger generator 20. The input of the trigger generator is connected to the capacitor 17 while the magnet winding 12 is arranged at the output thereof.

The shutter which is shown in an inoperative position in FIGS. 1 and 2 operates in the following manner. In the shown basic position the shutter opening sector 2 covers the opening 14 and the cam 3 urges the spring leaf 9 back so that the shutter closing sector 4 engage the poles of the magnet 11 with the anchor 13. When the switch 16 is closed at this point by the pressing of a release button on the camera (not shown), the following movements occur simultaneously:

(1) Motor 19 is energized and produces a rotation of axis 1, rotating shutter opening sector 2, cam 3 and cam disc 6 in the direction of the arrow.

(2) Trigger generator 20 is switched on and energizes the electromagnet winding 12. The magnet 11, returns the anchor 13 and also the shutter closing sector 4.

(3) The circuit of the photo-resistor 18 is closed by switch 7, which is opened by the rotation of cam 6.

Shortly before the shutter opening, sector 2 unblocks the film opening 14, the cam disc 6 opens the switch contact 7, so that the capacitor 17 begins to charge. The rate of charging is proportional to the surrounding light which determines the resistance of photo-resistor 18 in series with capacitor 17. When the capacitor has charged to its maximum charging voltage, the input to the trigger generator 20 is withdrawn so that there is now no output from the trigger generator 20. The energizing current is therefore removed from the magnet winding 12 causing anchor 13 to be released. The spring leaf 9 is no longer pushed back by the cam 3 since it has advanced in the meantime. Spring leaf 9 now presses the fork 8 and thereby the shutter closing sector 4 upwardly, so that the input light passage, which previously has been unblocked by the shutter opening sector 2, is now blocked again.

During the further advancement of the movable elements, the shutter opening sector 2, the cam 3 and the cam disc 6 resume positions in which only the shutter opening sector 2 closes the opening 14, while the cam 3 by pressing against the spring leaf 9, returns the shutter closing sector 4 into its basic position and switch 7 is closed again discharging capacitor 17. This cycle is repeated each time a picture is taken.

As is seen from the above disclosure, the exposure of the shutter depends only on the charging time of the capacitor 17 which is defined by the value of the photo-resistor 18 which in turn is proportional to the intensity of the received light.

It is to be understood that the embodiments herein are shown merely for illustrative purposes and that the invention is not to be limited to these embodiments alone, but rather by the claims appended below.

What I claim is:

1. In an automatic shutter apparatus for cameras having a photo-resistor, the resistance of which is proportional to the received light, a capacitor in series with said resistor, a battery in series with said resistor and capacitor forming a charging circuit, a trigger generator responsive to said charging circuit, an electromagnet responsive to the output of said trigger generator, and shutter controlling means cooperating with said electromagnet to permit the opening of said shutter for a period of time determined by said charging circuit, the combination of said shutter control means comprising; a rotatable shaft, a cam mounted on said shaft, a shutter closing sector also mounted on said shaft, a spring leaf mounted on a projection of said shutter closing sector, being engaged by said cam, and an anchor mounted to said shutter closing sector and retained by said electromagnet when said electromagnet is energized by the output of said trigger generator.

2. In a shutter according to claim 1, wherein said shutter control means further comprises; a cam disc mounted on said shaft, a switch mounted in said charging circuit actuated by said cam disc so that said capacitor will charge through said photo-resistor when said switch is released.

References Cited

UNITED STATES PATENTS 3,063,354 11/1962 Matulik et al. _____ 95—10
3,205,799 9/1965 Burgarella et al. _____ 95—10

JULIA E. COINER, *Primary Examiner.*